(12) United States Patent
Visintin et al.

(10) Patent No.: US 9,774,232 B2
(45) Date of Patent: Sep. 26, 2017

(54) CUTTING DEVICE

(75) Inventors: Massimiliano Visintin, Zurich (CH); Janusz Bialik, Nussbaumen (CH); Pascal Lucien Jacoulot, Dorans (FR); Pascal Breniaux, Dannemarie (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 185 days.

(21) Appl. No.: 13/467,506

(22) Filed: May 9, 2012

(65) Prior Publication Data
US 2012/0304843 A1 Dec. 6, 2012

(30) Foreign Application Priority Data

May 10, 2011 (EP) .................................... 11305562

(51) Int. Cl.
*B23D 1/20* (2006.01)
*H02K 15/00* (2006.01)
*H02K 3/487* (2006.01)

(52) U.S. Cl.
CPC ........... *H02K 15/0006* (2013.01); *B23D 1/20* (2013.01); *H02K 3/487* (2013.01); *Y10T 83/68* (2015.04)

(58) Field of Classification Search
CPC ... Y10T 83/68; Y10T 83/687; Y10T 83/7507; Y10T 83/7755; H02K 15/006; H02K 3/487; B23D 9/00; B23D 57/00; B23D 1/00; B23D 1/003; B23D 1/006; B23D 1/20
USPC .......................................................... 83/745
See application file for complete search history.

(56) References Cited

U.S. PATENT DOCUMENTS

| | | | | |
|---|---|---|---|---|
| 2,589,554 A | * | 3/1952 | Killian | ................. B23D 45/025 292/4 |
| 2,773,523 A | * | 12/1956 | Hopla | ............................. 83/745 |
| 4,077,292 A | * | 3/1978 | Cole | ............................... 83/745 |
| 4,237,762 A | * | 12/1980 | Winter | ........................... 83/745 |
| 4,320,678 A | * | 3/1982 | Volk | ............................... 83/574 |
| 5,323,962 A | * | 6/1994 | Jassby | ................ B23K 37/0533 105/29.1 |
| 5,394,781 A | * | 3/1995 | Tsubai | ........................... 83/449 |
| 5,778,518 A | | 7/1998 | Huber et al. | |
| 5,848,930 A | * | 12/1998 | Jones | .................... B23D 45/021 384/12 |
| 6,158,666 A | * | 12/2000 | Banks | ..................... B21J 15/10 105/25 |

(Continued)

FOREIGN PATENT DOCUMENTS

| | | |
|---|---|---|
| DE | 298 04 220 U1 | 6/1999 |
| EP | 0748030 B1 | 12/1996 |
| EP | 1624551 A2 | 2/2006 |

OTHER PUBLICATIONS

Johannes Ahlinder and Thomas Johansson Synchronous superlative, 2001.*

(Continued)

*Primary Examiner* — Phong Nguyen
(74) *Attorney, Agent, or Firm* — Buchanan Ingersoll & Rooney PC

(57) ABSTRACT

A cutting device for cutting a wedge and/or conductive bar or coils and/or part of thereof within a slot of an electric machine includes a saw with at least a blade, a guide for guiding the saw during cutting, the guide being connectable to the electric machine. The saw and the guide are withheld together preventing their separation.

13 Claims, 4 Drawing Sheets

(56) References Cited

U.S. PATENT DOCUMENTS

| | | | | |
|---|---|---|---|---|
| 6,457,469 | B1* | 10/2002 | Mueller et al. | 125/23.01 |
| 7,610,839 | B1* | 11/2009 | Bessette | 83/743 |
| 7,849,773 | B1* | 12/2010 | Hamby | B25H 1/18 |
| | | | | 108/142 |
| 2004/0079215 | A1* | 4/2004 | Vlaar | 83/745 |
| 2006/0032356 | A1* | 2/2006 | Newman et al. | 83/486 |
| 2010/0162560 | A1 | 7/2010 | Lape et al. | |

OTHER PUBLICATIONS

Office Action issued on Jul. 1, 2013, by the European Patent Office in corresponding European Patent Application No. 12 167 555.7. (6 pages).

* cited by examiner

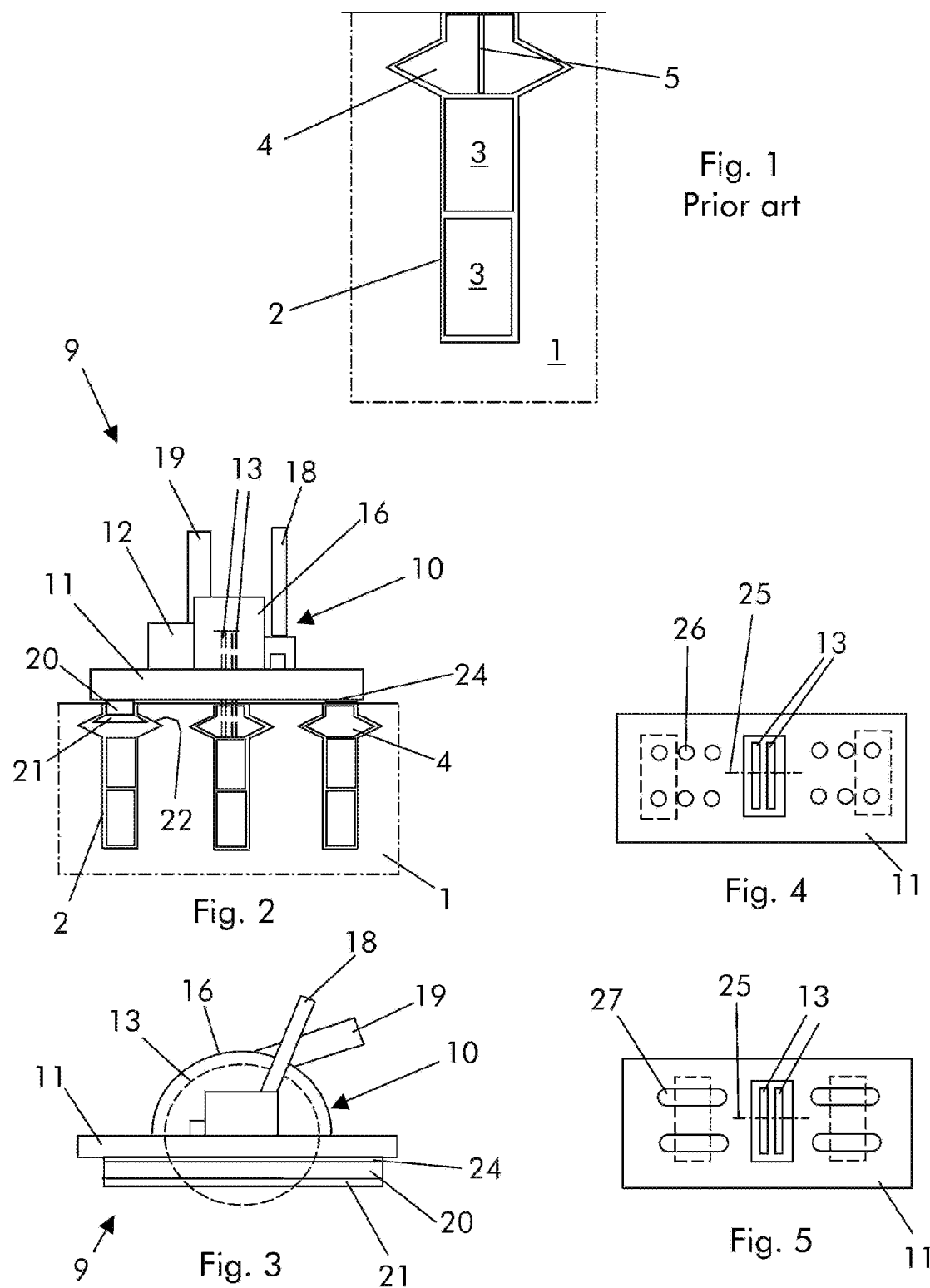

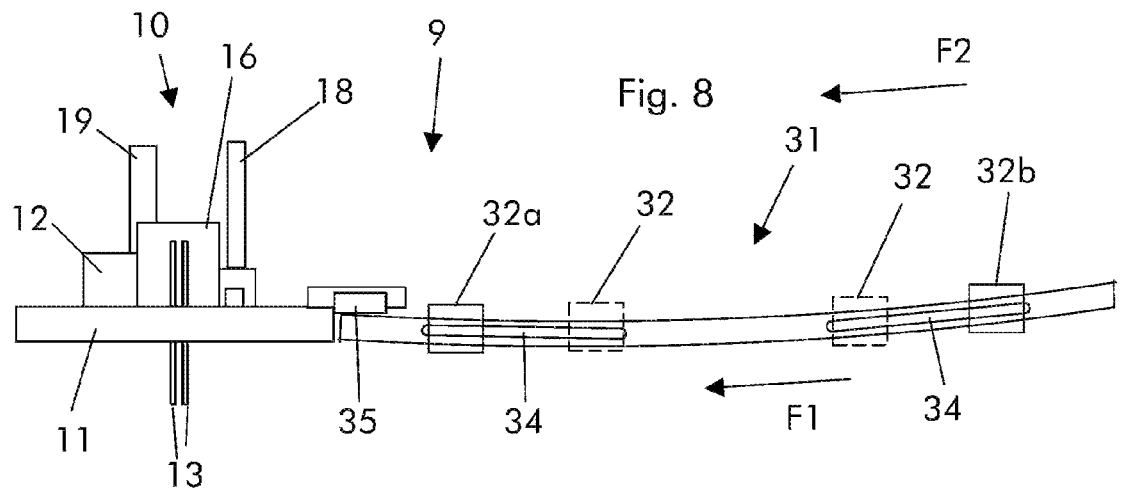
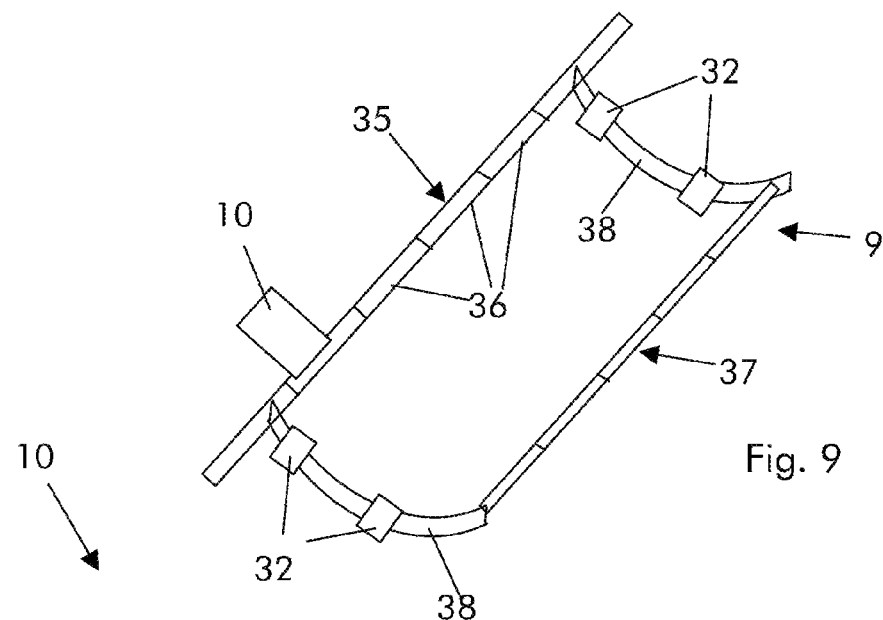
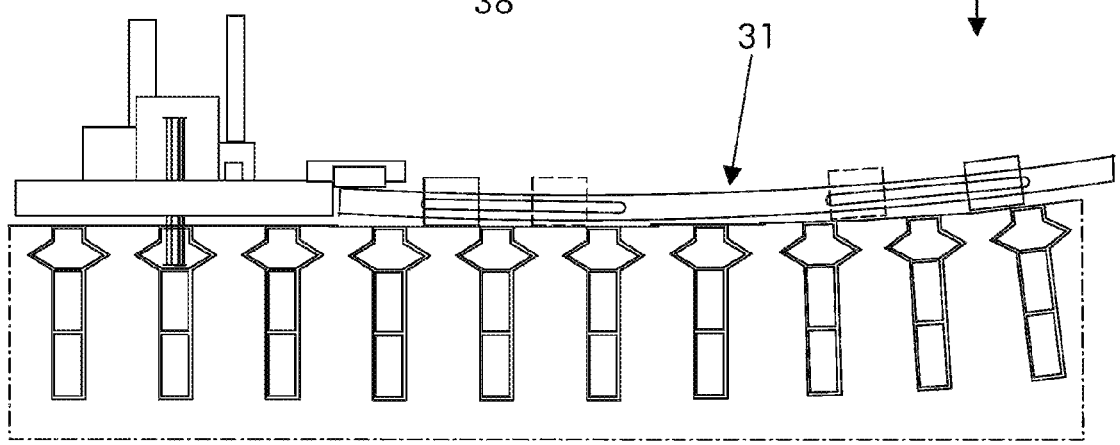

CUTTING DEVICE

CROSS-REFERENCE TO RELATED APPLICATIONS

The present application hereby claims priority under 35 U.S.C. Section 119 to European Patent application number 11305562.8, filed May 10, 2011, the entire contents of which are hereby incorporated by reference.

FIELD OF THE INVENTION

The present invention relates to a cutting device; in particular the invention refers to a cutting device for cutting a wedge and/or a conductive bar or coil and/or part of them within a stator and/or rotor slot of an electric machine. The electric machine may be an electric motor or an electric generator or also another different machine; in the following reference to a synchronous electric generator with impregnated stator core is made.

BACKGROUND

Electric machines have a stator and a rotor; the stator typically has a stator core with slots that house conductive stator bars. The stator bars have a straight portion housed within the slots (slot portion) blocked by wedges, and portions outside of the slots (end windings). The stator core with the stator bars may be immersed in a resin bath to impregnate all components and realize a stiff and compact structure.

In some cases a rewind (i.e. a replacement of the old stator bars with new stator bars) is needed in order to extend the lifetime of the electric machine, thus the stator bars must be removed from the stator core.

In order to remove the stator bars from the stator core, the end windings are generally cut and removed first, typically with a portable saw. Afterward the wedges are removed typically by means of a portable saw and finally the bars are stripped out from the slots.

With reference to FIG. 1, a portion of a stator core 1 with a slot 2 is shown; stator bars 3 (two in this example) are housed in the slot 2 and blocked by a wedge 4.

In order to remove the stator bars 3, an operator sits within the stator core (i.e. in its bore) and using the portable saw makes a cut 5 in the wedge 4. Thanks to this cut 5, the wedge 4 can be removed for example with the help of a hammer. Afterwards also the stator bars 3 can be removed, for example with the hammer or a different stripping device.

This way of removing the stator bars 3 from the slots 2 has some problems. In fact, cutting the wedge 4 with a portable saw is exceptionally time consuming and thus it sensibly contributes to increase the time length of the rewind. Since the rewind implies an outage of the electric machine, its time length should be reduced to the minimum.

In addition, cutting the wedge with a manually operated portable saw has the risk that during cutting the stator core is damaged. The stator core is made of a plurality of iron sheets electrically insulated from one another; this structure allows inducing a magnetic field in the whole stator core, without any circulation of eddy currents.

In case during an improper wedge cutting the stator core is damaged, in a small area close to a slot 2, a number of different iron sheets could be electrically connected each other, thus allowing a circulation of eddy currents during operation.

Even if such a circulation of eddy currents is localized, it can cause local high losses that in turn lead to local high temperatures and thus localized accelerated aging.

The localized accelerated aging can lead to machine failure, indeed stator and/or rotor bars are generally insulated with mica tapes impregnated with a resin; this resin is generally very sensitive to the temperature and requires specific operating temperatures not to be exceeded to ensure the expected lifetime of the machine.

In addition, during cutting the operator sits within the stator core; in case the stator core is relatively small it could be very troubling for the operator to sit therein and operate the portable electric saw without risks for the operator himself. In particular, it is typically very troubling cutting the wedges at the top of the stator core.

US2010/0162560 discloses a device with guides to drive the cut of the wedges; this device has the disadvantage that the operator has to hold the device in all conditions, such that working can be troubling and ineffective.

SUMMARY

The present disclosure is directed to a cutting device for cutting a wedge and/or conductive bar or coil and/or parts thereof within a slot of an electric machine. The device includes a saw with at least a blade and at least a guide for guiding the saw during cutting, the guide being connectable to the electric machine. The saw and the guide are held together preventing their separation.

BRIEF DESCRIPTION OF THE DRAWINGS

Further characteristics and advantages of the invention will be more apparent from the description of a preferred but non-exclusive embodiment of the device illustrated by way of non-limiting example in the accompanying drawings, in which:

FIG. 1 is a schematic view of a slot of a stator core with a wedge cut with a device according to the prior art;

FIGS. 2 and 3 are respectively a front view and a side view of a device in an embodiment of the invention;

FIGS. 4 and 5 are two different views from the bottom of the device;

FIGS. 8-10 show a device in a different embodiment of the invention;

DETAILED DESCRIPTION OF EMBODIMENTS OF THE INVENTION

Introduction to the Embodiments

Figure 6:
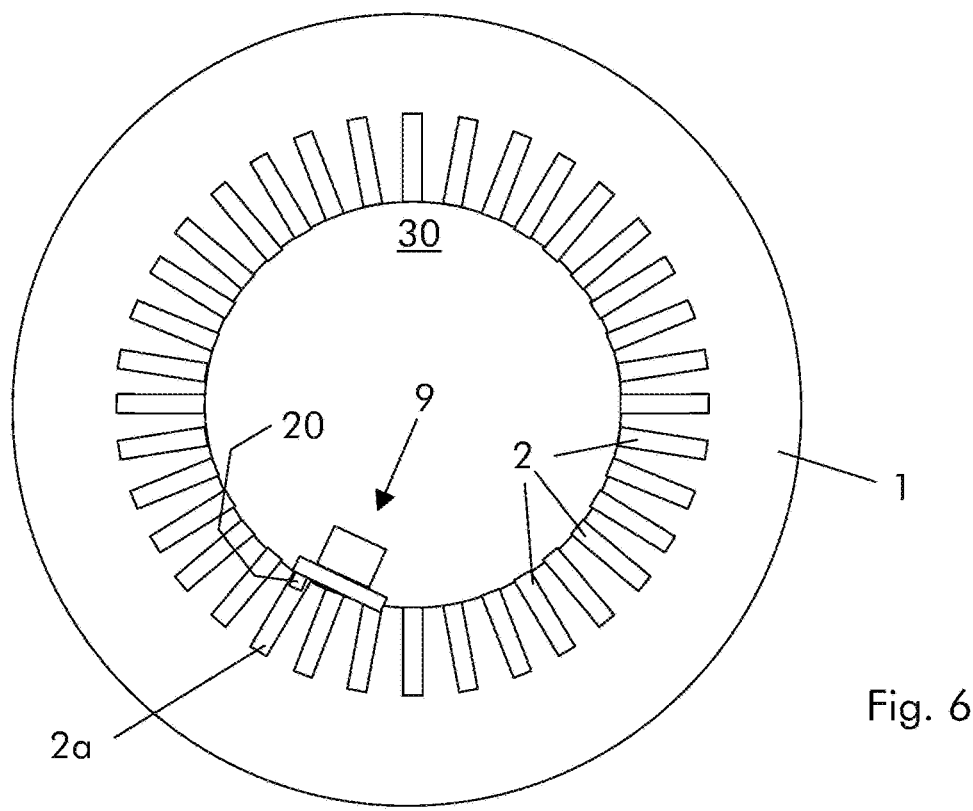
FIGS. 6 and 7 show a stator core and a portion thereof respectively during and after operation of the device.
Figure 7:
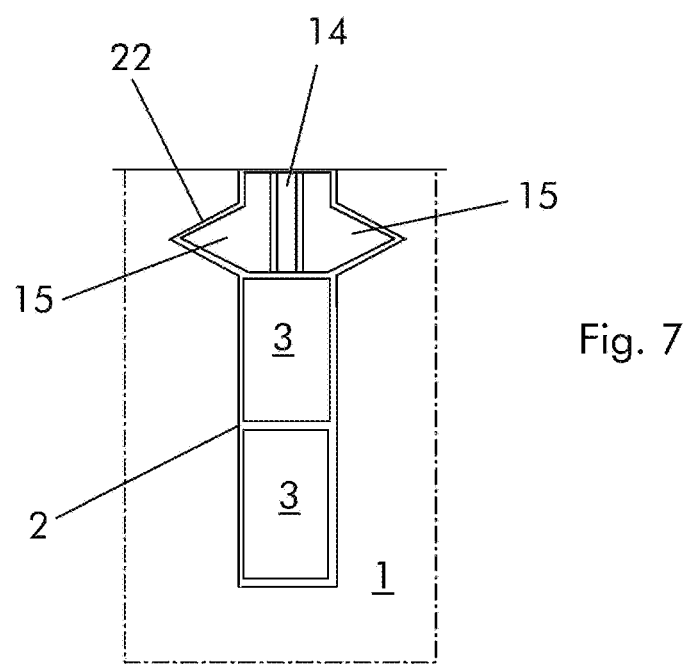
Figure 11:
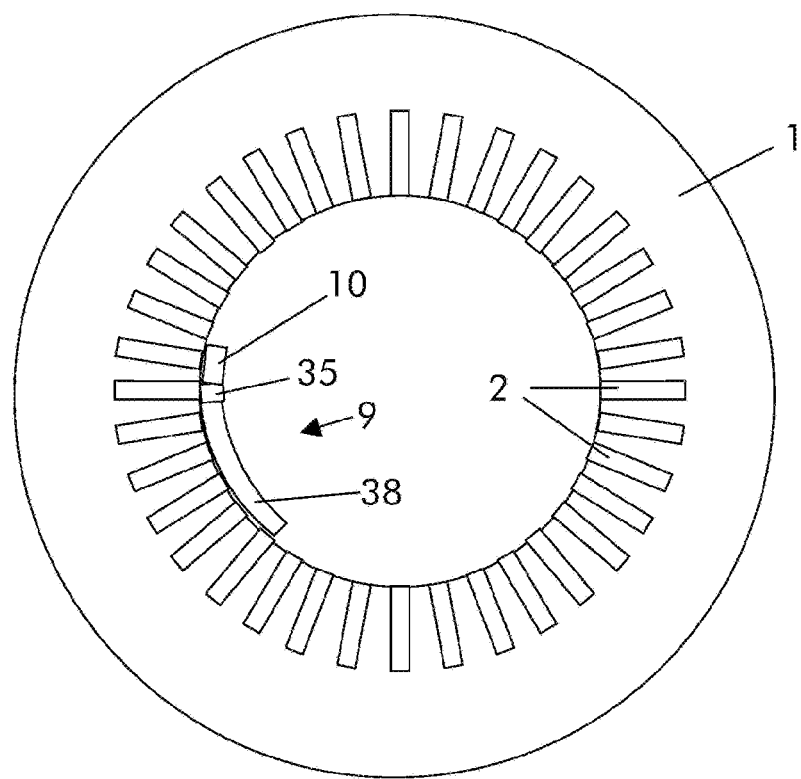
FIG. 11 show a stator core during cutting with the device in the different embodiment of the invention.

An aspect of the present invention therefore includes providing a device by which cutting the wedges located above the straight portions of the stator bars housed within the slots is quick and, in particular, much quicker than with traditional saws.

Another aspect of the invention is to provide a device by which the risk of damaging the stator core when cutting the wedges is in general low and in particular lower than with manual saws.

Another aspect of the invention is to provide a device by which the working conditions for the operators are improved.

A further aspect of the invention includes providing a device by which also the stator and/or rotor bars or coils and/or part of them and the stator and/or rotor wedges can be cut.

The technical aim, together with these and further aspects, are attained according to the invention by providing a device in accordance with the accompanying claims.

DETAILED DESCRIPTION

With reference to the figures, which show a cutting device 9 for cutting a wedge 4 and/or a conductive bar within a slot 2 of an electric machine.

The device 9 includes a saw 10 that for example has a base plate 11 that carries a motor 12 (for example an electric, pneumatic or also different motor) connected to at least one blade 13.

For example, the blades 13 can be blades rotating in the same direction or two counter-rotating blades (i.e. blades rotating in opposite directions); alternatively, one single blade 13 can also be provided instead of two (or more) blades. Use of two blades 13 allows cutting and thus removal of a central portion 14 of the wedge 4 such that after cutting two separate portions 15 are left within the slot 2. Removal of these two portions 15 is typically easy and quick because a large space between them is provided (much larger than the space created with one single cut). Around the blades 13 a guard 16 is provided, to protect the operator.

In addition, the saw is also preferably provided with a suction element 18, to remove debris generated during cutting, and a handle 19, for example, connected to the base plate 11. Advantageously, the device 9 also has a guide for guiding the saw 10 during cutting.

The saw 10 and the guide are held together preventing their separation; in other words, the guide and the saw are connected together in such a way that during cutting the saw 10 cannot be separated from the guide.

FIGS. 2-5 show a first embodiment of the device. In this first embodiment, the guide includes a slide 20 that can be slidably housed within a slot 2 of an electric machine. The slide 20 has preferably a dovetail part or enlarged part 21 at its free border; this part 21 can engage the slot 2 (that typically has recessed sides 22) to hold the device in any position over the stator core circumference (such that the operator does not need to hold the device).

The slide 20 can be removably connected to the saw 10 (in particular to its base plate 11). In addition, the device 9 can also have a set of slides 20 having different dimensions or shapes, such that they can cooperate with different generators having slots having different dimensions and shapes and can substantially completely cut wedges having different thickness without damaging the stator bars.

Preferably, the device 9 has a second slide 24 at an opposite position of the saw 10 with respect to the first slide. This slide 24 has a small thickness and is arranged to slide above a wedge 4, which is still to be cut.

Moreover, the saw 10 and slide 20 can have adjustable connecting elements (preferably in a direction parallel to a rotation axis 25 of the blades 13) to fit the slot-to-slot distance and to fine tune the cutting angle.

Likewise, the saw 10 and second slide 24 can also have adjustable connecting elements (preferably in a direction parallel to the rotation axis 25 of the blades 13) to fit the slot-to-slot distance and to fine tune the cutting angle. Thus, the position of both the first and second slides 20, 24 is adjustable, preferably but not necessarily in a direction parallel to the axis 25 of the blades 13.

For example these connecting elements are defined by holes 26 (FIG. 4) or slots 27 (FIG. 5) in the base plate 11 and in the slides 20 and 24, with screw or bolds to engage them. Alternatively the screw or bolds can also extend from the base plate 11 or slide 20 and/or 24. The connecting elements between the base plate 11 and the slide 20, 24 can be the same or different according to the needs.

The operation of the device in this embodiment is substantially the following. With reference to FIG. 6 that shows a stator core of an electric machine such as an electric generator, after the end winding has been cut and removed, a wedge must be removed from a first slot 2a without the use of the device 9; for example it can be done in a traditional way; this is typically not particularly troubling because the position of the slot to be cut away in the traditional way can be freely selected by the operator (who will thus select the slot in the most comfortable position).

When the first wedge has been removed from the first slot 2a, the operator can select the correct slide 20 such that it slidingly fits the slot 2a, and the slide 24. Thus, the operator can insert the slide 20 into the slot 2a, with the part 21 engaging the recessed sides 22 and cut over the whole wedge length, by making the slide 20 slide within the slot 2a and the slide 24 slide above a wedge.

Thus, all the wedges 4 can be quickly and easily cut this way by housing in succession the slide 20 is the slots 2 whose wedge is removed.

Advantageously, also when a wedge in a troubling position is cut, such as for example those at the top 30 of the stator core 1 (see FIG. 6), the operator can rely on the slide 20 for withholding the device 9 and guiding it during the cut.

Figure 12:
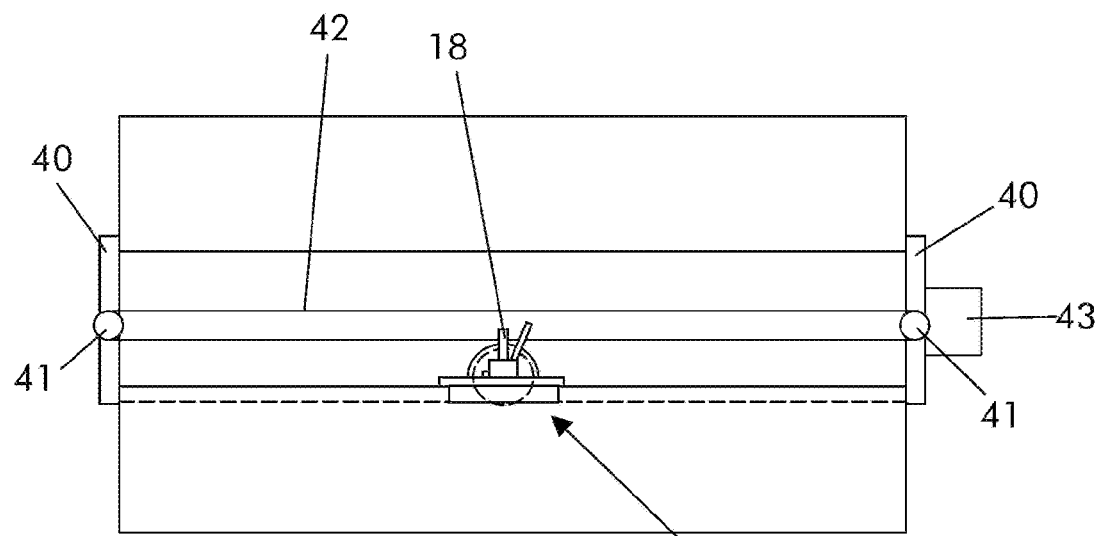
FIG. 12 shows a further embodiment of the device.

In the embodiment above (FIGS. 2-7) the device is hand driven by an operator sitting in the stator bore. Alternatively, as shown in FIG. 12, the device can also be driven using a tool connected to the stator. In this respect FIG. 12 shows a possible embodiment of such a tool that comprises supports 40 (for example bars connected outside of the stator) that support a driving element such as pulleys 41 that carry a wire 42; in addition one of the supports 40 may also carry a motor 43 for activating one of the pulley 40.

The handle 18 of the saw 10 is fixed to the driving element such as by wire 42; for example, and the handle 18 includes a clamp. The device in this embodiment can advantageously be driven without the need for the operator to sit within the stator bore.

FIGS. 8-10 show a different embodiment of the device. This embodiment is similar to the one already shown and in the attached figures like elements are indicated by like numbers throughout.

The device 9 in this embodiment has the saw 10 with one or two blades 13 that can rotate in the same direction or opposite directions as already described with reference to the first embodiment.

The other features can be the same as those already described with reference to the first embodiment and are not described again; in the attached figures like elements have like reference numbers.

The device 9 also has a guide for guiding the saw 10 during cutting; the guide in this embodiment is different from the guide of the first embodiment. In particular, the guide includes a frame 31 with removable connecting elements 32 for connecting the frame 31 to the electric machine (in particular to the bore of the stator core 1).

The connecting elements are selectively connectable to the electric machine, i.e. each connecting element 32 can be connected or disconnected independently of the others; for example the connecting elements 32 are permanent magnets that can be switched between an operating condition in which they generate a useful magnetic field to firmly hold the device to the stator surface and a non operating condition in which they do not generate the required magnetic field (for example the permanent magnets are lifted or rotated between the operating and non-operating conditions). These magnets are commercially available.

Each connecting element 32 is connected for example via screws or bolts in slots 34 of the frame 31 such that it has at least two positions on the frame 31.

In this respect, FIG. 8 shows the connecting elements 32 in two different positions (in particular a connecting element at its actual position is depicted in solid line and in a possible different position in dashed line; in this embodiment all of the positions between the two positions at the ends of the slots 34 are possible. Alternatively, instead of slots, holes or a plurality of shorter slots can also be used.

The frame 31 carries a guide bar 35 that in turn carries the saw 10; the saw 10 is slidably connected to the guide bar 35, i.e. the guide bar 35 holds the saw 10.

Advantageously, the guide bar 35 can be made of a plurality of elements 36 that may be assembled to define a guide bar of the required length (for example as long as the stator wedge to be cut). The frame 31 and guide bar 35 define a ring shaped element. In addition, a side 37 of the frame 31 facing the guide bar 35 is made of a plurality of elements that may be assembled to the required length (its structure could be similar to the one of the guide bar 35 or also be different).

The frame 31 has sides 38 interposed between the guide bar 35 and the side 37 facing it; these sides have the slots 34 (or holes) and carry the connecting elements 32 in such a way that they can assume at least two positions on the frame 31 (in particular on its sides 38).

The operation of the device in this embodiment is substantially the following. Advantageously, no cut with a traditional saw is needed for the first slot. In fact, the frame 31 and the guide bar 35 can be assembled with the required length (for example by assembling the correct number of elements or elements having the correct length) to assemble a guide with a dimension matching the stator core length.

Thus, the guide (i.e. frame 31 and guide bar 35) is mounted within the stator core, with the guide bar 35 extending parallel to a slot; connection is achieved by providing the connecting elements 32 in the operating configuration (shown in solid line in FIG. 8).

Then the saw 10 is connected to the guide bar 35 and the wedge housed in the first slot is cut. Afterwards, the connecting elements 32b facing away from the saw 10 are disconnected and shifted as indicated by arrow F1; in this position they are connected again to the stator core 1.

Thus, the connecting elements 32a are disconnected and then the whole guide (i.e. frame 31 and guide bar 35 with saw 10 carried by it) is shifted as indicated by arrow F2, since it can be held by the connecting elements 32b only.

The connecting elements 32a are then preferably shifted again to a position close to the saw 10 and connected again to the stator 1.

Thus, it is preferred to set all connecting elements to the operating condition to ensure the strongest fixing during the wedge cutting.

In this new position the saw 10 is above a new wedge and can thus cut it.

These steps are repeated until all the wedges are cut.

It should be noted that the saw 10 is supported by the guide bar 35 that is in turn supported by the frame and stator core 1, thus alleviating the operator from this task.

Naturally, the features described may be independently provided from one another.

Advantageously, in all of the embodiments described, the guides can have such a shape or conformation as to easily allow cutting of the initial portion of the wedges or bars; for example the slide 20 can protrude from the saw 10 (in particular from its base plate 11) or the guide bar 35 can protrude from the stator core 1 when it is connected to it.

Even if particular reference to cutting of wedges or conductive bars housed in stator slots has been made, it is clear that the same cutting device can also be used to cut wedges or conductive bars or coils and/or part of them housed in rotor slots.

In practice the materials used and the dimensions can be chosen at will according to requirements and to the state of the art.

REFERENCE NUMBERS 1 stator core
2, 2a slot
3 stator bar
4 wedge
5 cut
9 device
10 saw
11 base plate
12 motor
13 blades
14 portion of 4
15 portion of 4
16 guard
18 suction element
19 handle
20 slide
21 part of 20
22 recessed side of 2
24 second slide
25 rotation axis of 13
26 holes
27 slots
30 top of 1
31 frame
32 connecting element
32a, 32b connecting element
34 slots
35 guide bar
36 element of 35
37 side of 31
38 side of 31
40 supports
41 pulleys
42 wire
43 motor
F1, F2 arrows

What is claimed is:

1. Cutting device for cutting a wedge and/or conductive bar or coil within a first slot in a stator core or rotor core of at least one of a stator and a rotor of an electric machine, the device comprising:
  a saw with at least one blade having a cutting axis;
  a guide for guiding the saw during cutting, the guide being connectable to the electric machine, the saw and the guide are held together preventing their separation, wherein the guide includes:

a first slide configured to be slidably housed within a second slot in the stator core or rotor core; and a second slide at an opposite position of the saw with respect to the first slide, and configured to be slidably housed within a third slot in the stator core or rotor core, wherein the first slide and the second slide are arranged on opposite sides of the at least one blade and configured to slide along parallel axes and the first and second slides are dovetail shaped and configured to engage respective recessed sides of the second and third slots.

2. The device according to claim 1, wherein the first slide is removably connected to the saw.

3. The device according to claim 2, further comprising a set of slides having different dimensions or shapes.

4. The device according to claim 1, wherein the first and second slide positions are adjustable, preferably in a direction parallel to a rotation axis of the blade.

5. Cutting device for cutting a wedge and/or conductive bar or coil within a first slot in a stator core or rotor core of at least one of a stator and a rotor of the electric machine, the device comprising:

a saw with at least one blade having a cutting axis;

a guide for guiding the saw during cutting, the guide being connectable to the electric machine, the saw and the guide are held together preventing their separation, wherein the guide includes:

a first slide configured to be slidably housed within a second slot in the stator core or rotor core; and a second slide at an opposite position of the saw with respect to the first slide, and configured to be slidably housed within a third slot in the stator core or rotor core, wherein the first slide and the second slide are dovetail shaped and configured to engage respective recessed sides of the second and third slots, a frame with connecting elements for connecting the frame to the electric machine, the frame being curved in a direction perpendicular to the cutting axis of the blade, the curve corresponding to a stator core or rotor core inside curvature, and a guide bar arranged on the frame parallel to the cutting axis, the saw being slidably connected to the guide bar for cutting the wedge and/or conductive bar or coil in the first slot by the at least one blade.

6. The device according to claim 5, wherein the first slide protrudes from the saw.

7. The device according to claim 5, further comprising a tool connected to the stator, the tool comprising:

at least a support; and a driving element supported by the support, the saw being connected to the driving element, configured to drive the saw.

8. The device according to claim 5, wherein the connecting elements are selectively connectable to the electric machine.

9. The device according to claim 8, wherein at least one connecting element has at least two positions on the frame.

10. The device according to claim 5, wherein the guide bar is comprised of a plurality of elements configured to be assembled to define a guide bar of a required length.

11. The device according to claim 5, wherein the frame and guide bar define a ring shaped element.

12. The device according to claim 11, wherein a side of the frame facing the guide bar is made of a plurality of elements configured to be assembled to a required length.

13. The device according to claim 12, wherein the guide has sides interposed between the guide bar and the side facing it; wherein interposed sides carry at least two connecting elements, both connecting elements having at least two positions on the frame.

* * * * *